US012293666B2

(12) United States Patent
Avedisov et al.

(10) Patent No.: US 12,293,666 B2
(45) Date of Patent: May 6, 2025

(54) SYSTEMS AND METHODS FOR IDENTIFYING VEHICLES TO COMMUNICATE SAFETY MESSAGES

(71) Applicant: Toyota Motor Engineering & Manufacturing North America, Inc., Plano, TX (US)

(72) Inventors: Sergei S. Avedisov, Mountain View, CA (US); Seyhan Ucar, Mountain View, CA (US); Rui Guo, San Jose, CA (US); Onur Altintas, Mountain View, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 332 days.

(21) Appl. No.: 17/894,620

(22) Filed: Aug. 24, 2022

(65) Prior Publication Data

US 2024/0071229 A1 Feb. 29, 2024

(51) Int. Cl.
*G08G 1/16* (2006.01)
*G08G 1/00* (2006.01)
*G08G 1/01* (2006.01)

(52) U.S. Cl.
CPC ........... *G08G 1/166* (2013.01); *G08G 1/0145* (2013.01)

(58) Field of Classification Search
CPC ............................. G08G 1/166; G08G 1/0145
See application file for complete search history.

(56) References Cited

U.S. PATENT DOCUMENTS 10,193,854 B2 * 1/2019 Weinfield ............ H04L 43/0823
11,094,192 B2 8/2021 Malhan et al.
(Continued)

FOREIGN PATENT DOCUMENTS

WO 2020160934 A1 8/2020
WO 2021097810 A1 5/2021

OTHER PUBLICATIONS

Kobayashi et al., "Vehicle-to-vehicle message sender identification for co-operative driver assistance systems," In 2019 IEEE 89th Vehicular Technology Conference (VTC2019—Spring), 2019, pp. 1-5.
(Continued)

*Primary Examiner* — Adam D Tissot
(74) *Attorney, Agent, or Firm* — Christopher G. Darrow; Darrow Mustafa PC

(57) ABSTRACT

System, methods, and other embodiments described herein relate to identifying connected vehicles through invoking maneuvers by vehicles that assist with distinguishing between safety messages having unassociated identifiers originating from the connected vehicles. In one embodiment, a method includes identifying surrounding vehicles including indeterminate vehicles from a driving environment using temporary identifiers received from the surrounding vehicles. The method also includes generating trajectories for the indeterminate vehicles. The method also includes distinguishing the indeterminate vehicles from communications using the temporary identifiers by observing execution of the trajectories by the indeterminate vehicles. The method also includes executing a planning task by a subject vehicle using safety information from the communications.

20 Claims, 7 Drawing Sheets

(56) References Cited

U.S. PATENT DOCUMENTS

| | | | |
|---|---|---|---|
| 2015/0166069 A1 | 6/2015 | Engelman et al. | |
| 2018/0205699 A1* | 7/2018 | Weinfield | H04W 4/023 |
| 2021/0031800 A1* | 2/2021 | Fuchs | B60W 60/0027 |
| 2021/0360373 A1 | 11/2021 | Yang et al. | |
| 2022/0415175 A1* | 12/2022 | Vassilovski | G08G 1/096783 |

OTHER PUBLICATIONS

Jiang et al., "Cyber-Physical Identification of Connected Vehicles with V2V Shared Sensing Data," In 26th ITS World Congress, Oct. 2019, pp. 1-8.
U.S. Appl. No. 17/478,851, filed Sep. 17, 2021.
U.S. Appl. No. 17/458,943, filed Aug. 27, 2021.

* cited by examiner

SYSTEMS AND METHODS FOR IDENTIFYING VEHICLES TO COMMUNICATE SAFETY MESSAGES

TECHNICAL FIELD

The subject matter described herein relates, in general, to communicating between vehicles, and, more particularly, to identifying connected vehicles by invoking trajectories that assist with distinguishing between safety messages.

BACKGROUND

Connected vehicles have sensors that generate data for systems to perceive other vehicles and additional aspects of a surrounding environment. For example, a connected vehicle is equipped with a light detection and ranging (LIDAR) sensor that uses light to scan the surrounding environment, while logic associated with the LIDAR analyzes acquired data detecting a presence of other vehicles and the surrounding environment. In further examples, cameras and radar acquire information about the surrounding environment from which a system derives awareness about aspects of the surrounding environment. In various implementations, a connected vehicle uses sensor data to perform cooperative driving with other vehicles. Here, vehicles may coordinate maneuvers, assist with perception, and so on for safety and traffic management when performing cooperative driving. Tasks related to cooperative driving involve distinguishing information from different vehicles perceived by vehicle systems. These tasks can be difficult in driving scenarios involving traffic congestion, diminished lighting, obstructions, and so on.

In one approach, vehicles in an area communicate and coordinate through safety messages. A system can identify a remote vehicle by comparing location data in a safety message to sensor data acquired by the vehicle. However, location data and sensor data are susceptible to measurement errors. For example, errors occur when temporary identifiers are indistinguishable without having other data for differentiation. As such, a connected vehicle experiences connection delays that decrease safety, hampers connected applications, and frustrates operators.

SUMMARY

In one embodiment, example systems and methods that improve identifying connected vehicles through invoking maneuvers by vehicles, thereby distinguishing between safety messages having unassociated identifiers originating from the connected vehicles are disclosed. In various implementations, systems encounter difficulties identifying connected vehicles for coordination and cooperation. For example, a basic safety message (BSM) from a vehicle has a similar identifier (ID) of another vehicle or changes the ID according to communication standards. As such, a receiving vehicle is unable to distinguish the vehicle transmitting the BSM from a nearby vehicle using the ID and sensor data measured a priori, especially when location data within the BSM has errors. For example, BSMs with errors in location data from different vehicles appear to originate from the same source. In addition, distinguishing communications from different sources is also difficult when separation and velocity differences between surrounding vehicles are minimal. Therefore, in one embodiment, an identification system of a vehicle represents a driving environment using acquired data and distinguishes BSMs by observing suggested maneuvers executed by a vehicle. In one approach, using sensor and location data to represent a driving environment involves comparing perception computations by the vehicle (e.g., ego vehicle) to surrounding vehicles for identifying indeterminate vehicles. A vehicle communicating with an ego vehicle may be indeterminate because of a temporary identifier in a BSM that is the same as another vehicle transmitting nearby, errors in positioning data, and so on. As such, the identification system generates trajectories having future coordinates and velocity changes as signatures for the indeterminate vehicle to follow within the driving environment. The vehicle can instruct the indeterminate vehicle to execute the trajectory in a maneuver message (MM) for distinguishing BSMs. In one approach, the vehicle induces execution of the trajectories by adapting motion using a vehicle-following model. As such, the vehicle differentiates BSMs from the surrounding vehicles by observing the execution of the trajectories and through improved attributes (e.g., spacing, velocity, etc.). Accordingly, the identification system improves BSM communication by using trajectories as signatures for identifying surrounding vehicles, thereby improving safety and traffic management.

In one embodiment, an identification system for identifying connected vehicles through invoking maneuvers by vehicles that assist with distinguishing between safety messages having unassociated identifiers originating from the connected vehicles is disclosed. The identification system includes a processor and memory storing instructions that, when executed by the processor, cause the processor to identify surrounding vehicles including indeterminate vehicles from a driving environment using temporary identifiers received from the surrounding vehicles. The instructions also include instructions to generate trajectories for the indeterminate vehicles. The instructions also include instructions to distinguish the indeterminate vehicles from communications using the temporary identifiers by observing execution of the trajectories by the indeterminate vehicles. The instructions also include instructions to execute a planning task by a subject vehicle using safety information from the communications.

In one embodiment, a non-transitory computer-readable medium for identifying connected vehicles through invoking maneuvers by vehicles that assist with distinguishing between safety messages having unassociated identifiers originating from the connected vehicles and including instructions that when executed by a processor cause the processor to perform one or more functions is disclosed. The instructions include instructions to identify surrounding vehicles including indeterminate vehicles from a driving environment using temporary identifiers received from the surrounding vehicles. The instructions also include instructions to generate trajectories for the indeterminate vehicles. The instructions also include instructions to distinguish the indeterminate vehicles from communications using the temporary identifiers by observing execution of the trajectories by the indeterminate vehicles. The instructions also include instructions to execute a planning task by a subject vehicle using safety information from the communications.

In one embodiment, a method for identifying connected vehicles through invoking maneuvers by vehicles that assist with distinguishing between safety messages having unassociated identifiers originating from the connected vehicles is disclosed. In one embodiment, the method includes identifying surrounding vehicles including indeterminate vehicles from a driving environment using temporary identifiers received from the surrounding vehicles. The method also includes generating trajectories for the indeterminate vehicles. The method also includes distinguishing the indeterminate vehicles from communications using the temporary identifiers by observing execution of the trajectories by the indeterminate vehicles. The method also includes executing a planning task by a subject vehicle using safety information from the communications.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
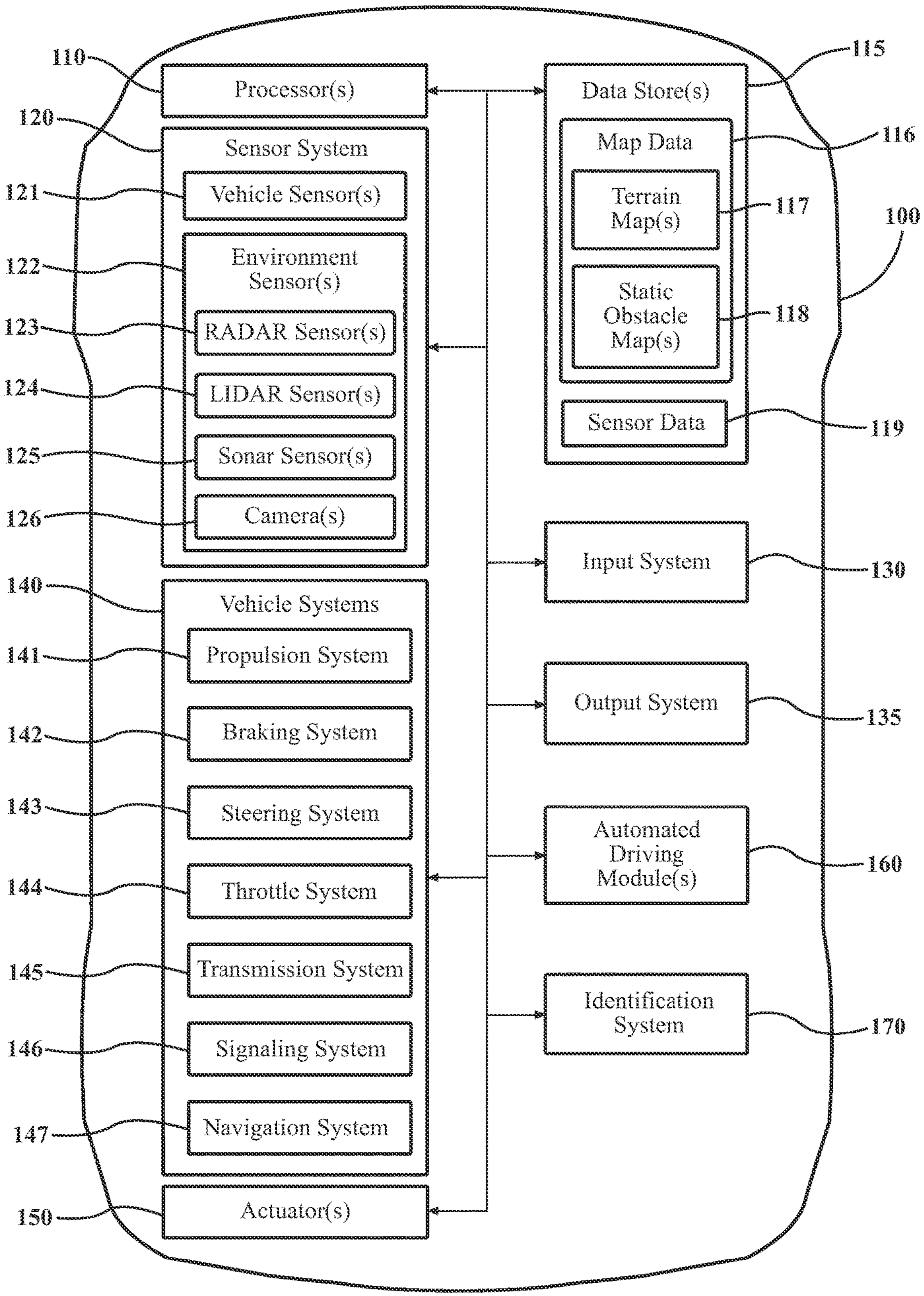
FIG. 1 illustrates one embodiment of a vehicle within which systems and methods disclosed herein may be implemented.

Systems, methods, and other embodiments associated with improving vehicle communications through invoking maneuvers by vehicles that help distinguish between safety messages having unassociated identifiers originating from the connected vehicles are disclosed. In various implementations, systems identifying safety messages from multiple sources encounter difficulties because message identifiers are indistinguishable or shared between connected vehicles. For example, a basic safety message (BSM) from a vehicle has a temporary identifier (ID) similar to other connected vehicles. This process may be specified by the society of automotive engineers (SAE) standards for certain BSMs. As such, a subject vehicle is unable to distinguish between nearby vehicles without other unique data (e.g., position, color, velocity, etc.) when implementing standards. The vehicle is also unable to identify other vehicles because sensor measurements lack indications or attributes associated with the identifier in a BSM. Therefore, in one embodiment, an identification system invokes trajectories to identify safety communications from indeterminate vehicles in a driving environment. In particular, the identification system generates the trajectories so that safety messages from connected vehicles using unassociated identifiers are distinguishable through observed attributes. In one approach, the identification system transmits a maneuver message (MM) having coordinate and velocity changes defining safe trajectories for execution by the indeterminate vehicle. A subject vehicle (e.g., ego vehicle) observes the trajectory and updated attributes (e.g., separation, position, velocity, etc.) that distinguish safety messages between the indeterminate vehicle and connected vehicles.

In various implementations, the subject vehicle induces the indeterminate vehicle to execute the trajectories using a vehicle-following model that predicts reactions between vehicles in traffic. In particular, the subject or determinate vehicle executes motions from the vehicle-following model while mitigating traffic disturbances. The motion causes an indeterminate vehicle to execute a trajectory. This action assists with distinguishing safety messages amongst vehicles through observations and attribute differentiation. In one approach, the identification system determines the motions using a cost function. This computation allows the identification system to safely request increased velocity differences between the indeterminate vehicle and other vehicles having active connections with the subject vehicle. In this way, the subject vehicle distinguishes safety messages from surrounding vehicles by observing specific attributes. Furthermore, the observations may be enhanced when the subject vehicle compares local perceptions with remote perceptions received from the connected vehicles. Accordingly, the identification system invokes trajectories so that the subject vehicle distinguishes safety messages by surrounding vehicles having unassociated identifiers through observation, thereby improving safety and connectivity.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, an identification system 170 uses road-side units (RSU), consumer electronics (CE), mobile devices, robots, drones, and so on that benefit from the functionality discussed herein associated with improving vehicle communications by invoking maneuvers that help distinguish between safety messages having unassociated identifiers.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes an identification system 170 that is implemented to perform methods and other functions as disclosed herein relating to improving vehicle communications by invoking maneuvers that assist in distinguishing between safety messages having unassociated identifiers.

Figure 2:
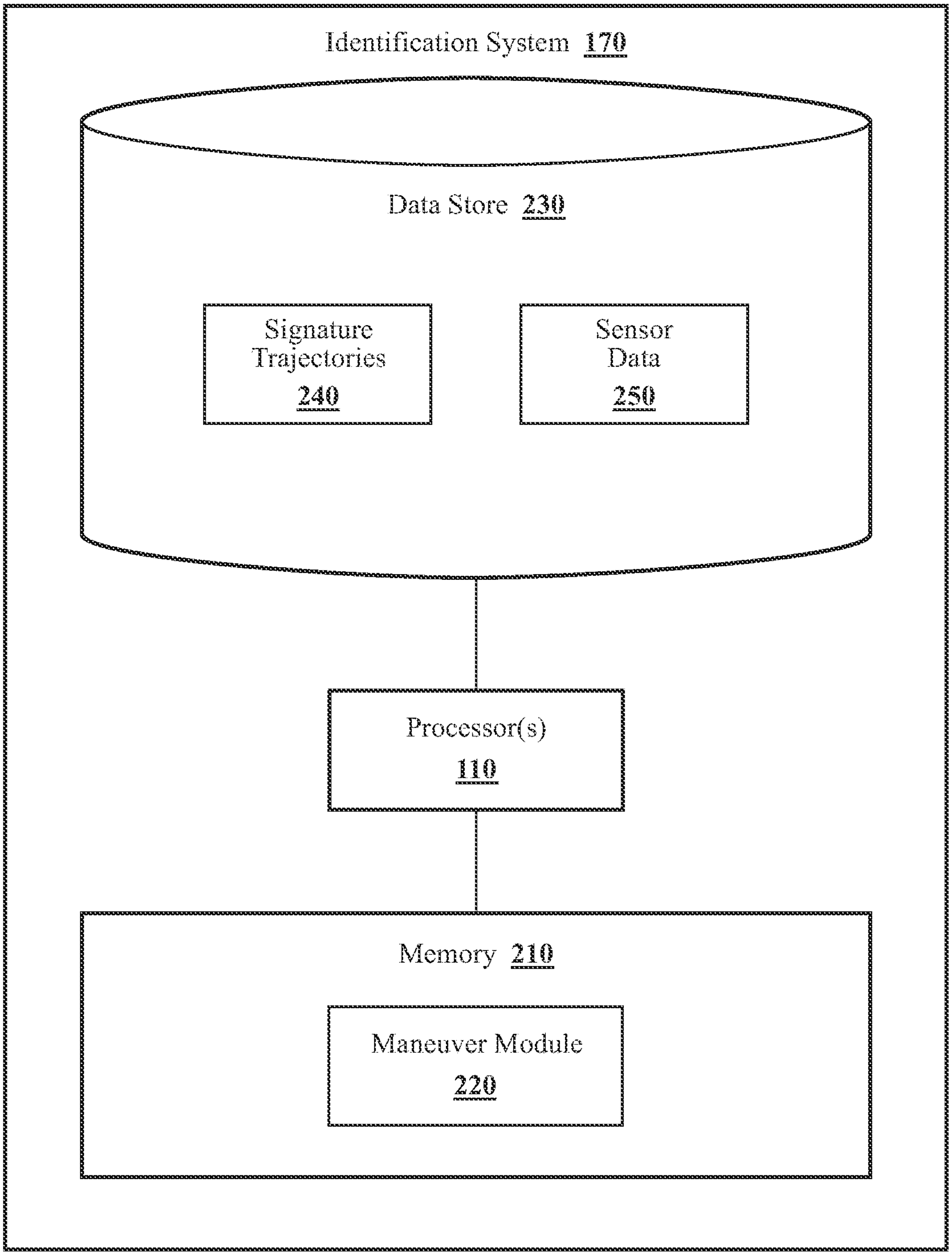
FIG. 2 illustrates one embodiment of an identification system that is associated with invoking trajectories that help distinguish between communicated safety messages.

With reference to FIG. 2, one embodiment of the identification system 170 of FIG. 1 is further illustrated. The identification system 170 is shown as including a processor(s) 110 from the vehicle 100 of FIG. 1. Accordingly, the processor(s) 110 may be a part of the identification system 170, the identification system 170 may include a separate processor from the processor(s) 110 of the vehicle 100, or the identification system 170 may access the processor(s) 110 through a data bus or another communication path. In one embodiment, the identification system 170 includes a memory 210 that stores a maneuver module 220. The memory 210 is a random-access memory (RAM), a read-only memory (ROM), a hard-disk drive, a flash memory, or other suitable memory for storing the maneuver module 220. The maneuver module 220 is, for example, computer-readable instructions that when executed by the processor(s) 110 cause the processor(s) 110 to perform the various functions disclosed herein.

The identification system 170 as illustrated in FIG. 2 is generally an abstracted form of the identification system 170. Furthermore, the maneuver module 220 generally includes instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided for herein, the maneuver module 220, in one embodiment, acquires sensor data 250 that includes at least camera images. In further arrangements, the maneuver module 220 acquires the sensor data 250 from further sensors such as radar sensors 123, LIDAR sensors 124, and other sensors as may be suitable for identifying vehicles and locations of the vehicles.

Accordingly, the maneuver module 220, in one embodiment, controls the respective sensors to provide the data inputs in the form of the sensor data 250. Additionally, while the maneuver module 220 is discussed as controlling the various sensors to provide the sensor data 250, in one or more embodiments, the maneuver module 220 can employ other techniques to acquire the sensor data 250 that are either active or passive. For example, the maneuver module 220 may passively sniff the sensor data 250 from a stream of electronic information provided by the various sensors to further components within the vehicle 100. Moreover, the maneuver module 220 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

Moreover, in one embodiment, the identification system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the maneuver module 220 in executing various functions. In one embodiment, the data store 230 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on.

In various implementations, the data store 230 further includes the signature trajectories 240, defining maneuvers for connected vehicles that help distinguish communicated safety messages. Here, the identification may observe attributes (e.g., position, separation, path, etc.) of the signature trajectories 240 to differentiate safety messages between an indeterminate vehicle and an identifiable vehicle. As explained below, a subject vehicle may detect a BSM from an indeterminate vehicle after separation with an identifiable vehicle by using signature trajectories. In this way, the signature trajectories 240 improve connectivity by a subject vehicle distinguishing safety messages using unassociated identifiers from various sources.

Figure 3:
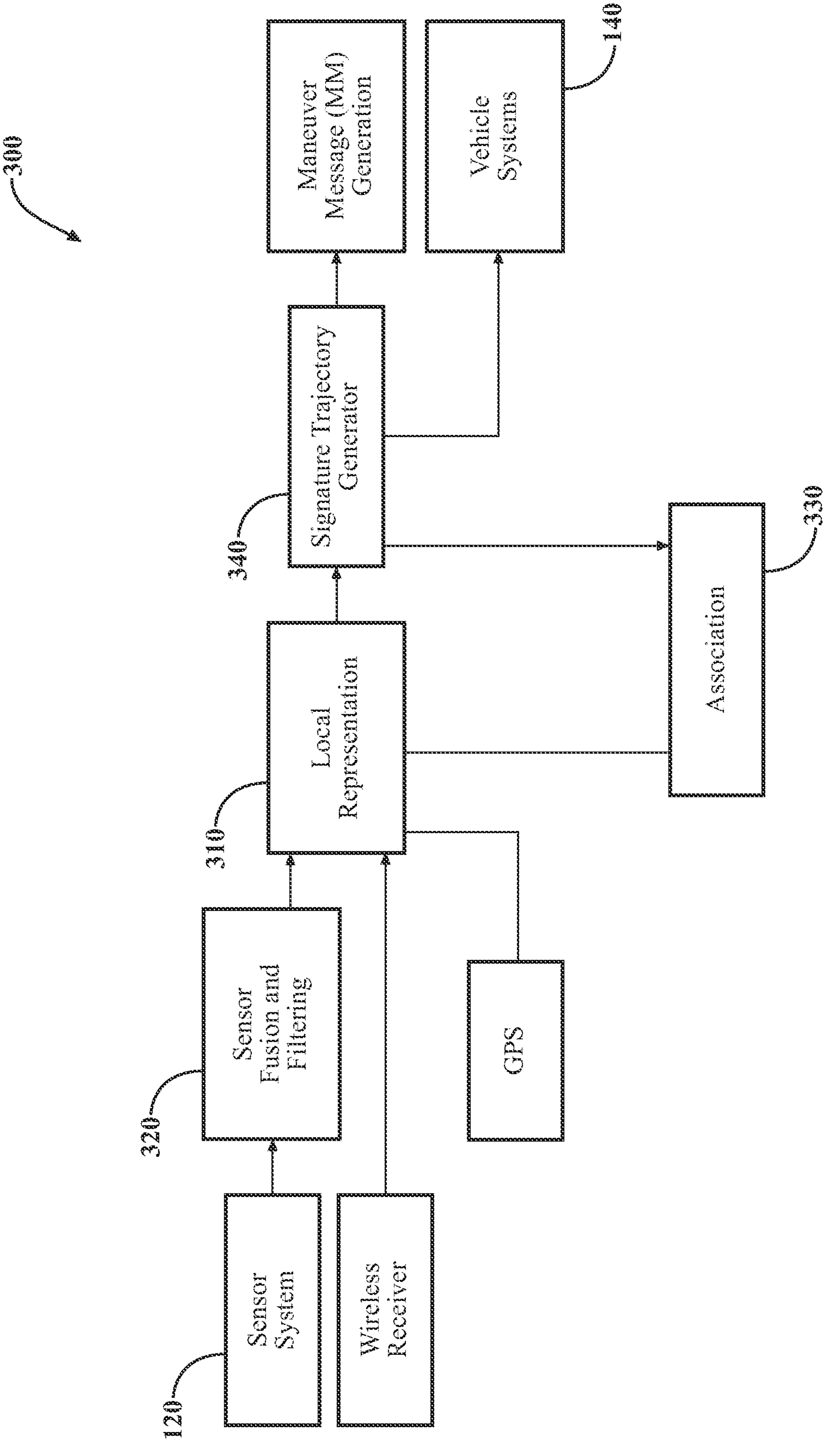
FIG. 3 illustrates one embodiment of generating signature trajectories for distinguishing between safety messages using vehicle maneuvers.

Now discussing FIG. 3, one embodiment of generating signature trajectories for distinguishing between safety messages using vehicle maneuvers 300 is illustrated. Here, the maneuver module 220 includes instructions causing the processor 110 to generate trajectories that help identify safety communications from indeterminate vehicles. The safety communications can include a BSM (e.g., standardized BSMs, including the SAE J2735 standard) that includes position, velocity, static/dynamic information, and so on of surrounding vehicles. As explained below, the identification system 170 can invoke trajectories through a MM to the surrounding vehicles. The MM may be a wireless message exchanged between road users and infrastructure that suggests a future trajectory(s) for a road user.

Furthermore, the MM may be a maneuver coordination message (MCM) standardized by the European Telecommunications Standards Institute (ETSI). The MM can also be a maneuver-sharing coordination message (MSCM) standardized by SAE J3186. In either case, the MM includes trajectory point, velocity, coordinates, and so on instructions that vehicles may execute for maneuvering.

Moreover, the identification system 170 generates a signature trajectory using a local representation. The sensor data 250 and associations of surrounding vehicles may be used for generating the local representation. As such, the local representation 310 function estimates attributes (e.g., position) of road users or objects in a scene. Here, the local representation 310 function receives data processed by the sensor fusion and filtering 320 function, communicated sensor data, and GPS data. In particular, the sensor fusion and filtering 320 function acquires data from the sensor system 120 that helps associate and distinguish communications from the surrounding vehicles. The local representation 310 function can be a computation model that performs coordinate transformations from the vehicle 100 to other vehicles from acquired data. In certain scenarios, the local representation 310 function misidentifies certain vehicles from errors in sensor and GPS data. As such, the local representation 310 function receives relations between surrounding vehicles from the association 330 function for assistance. Two or more vehicles may be associated if they are determinate, indeterminate, or both when communicating safety messages with unassociated or similar identifiers. For example, the association 330 function associates determinable vehicles using received identifiers, local perception, and remote perception.

Moreover, the signature trajectory generator 340 estimates trajectories for the subject or indeterminate vehicle, such as to distinguish between safety message communications. As explained below, the identification system 170 generates and communicates a MM when safety message communications can be distinguishable by observing other vehicles execute the trajectories. In combination with the MM or separately, the vehicle 100 executes a trajectory through vehicle systems to induce motion by indeterminate vehicles. Here, the identification system 170 observes the induced motion for distinguishing safety messages from the indeterminate vehicle traveling near determinable vehicles. Both spacing and motion observed for connected vehicles allow the vehicle 100 to distinguish between safety messages having unassociated identifiers.

Figure 4:
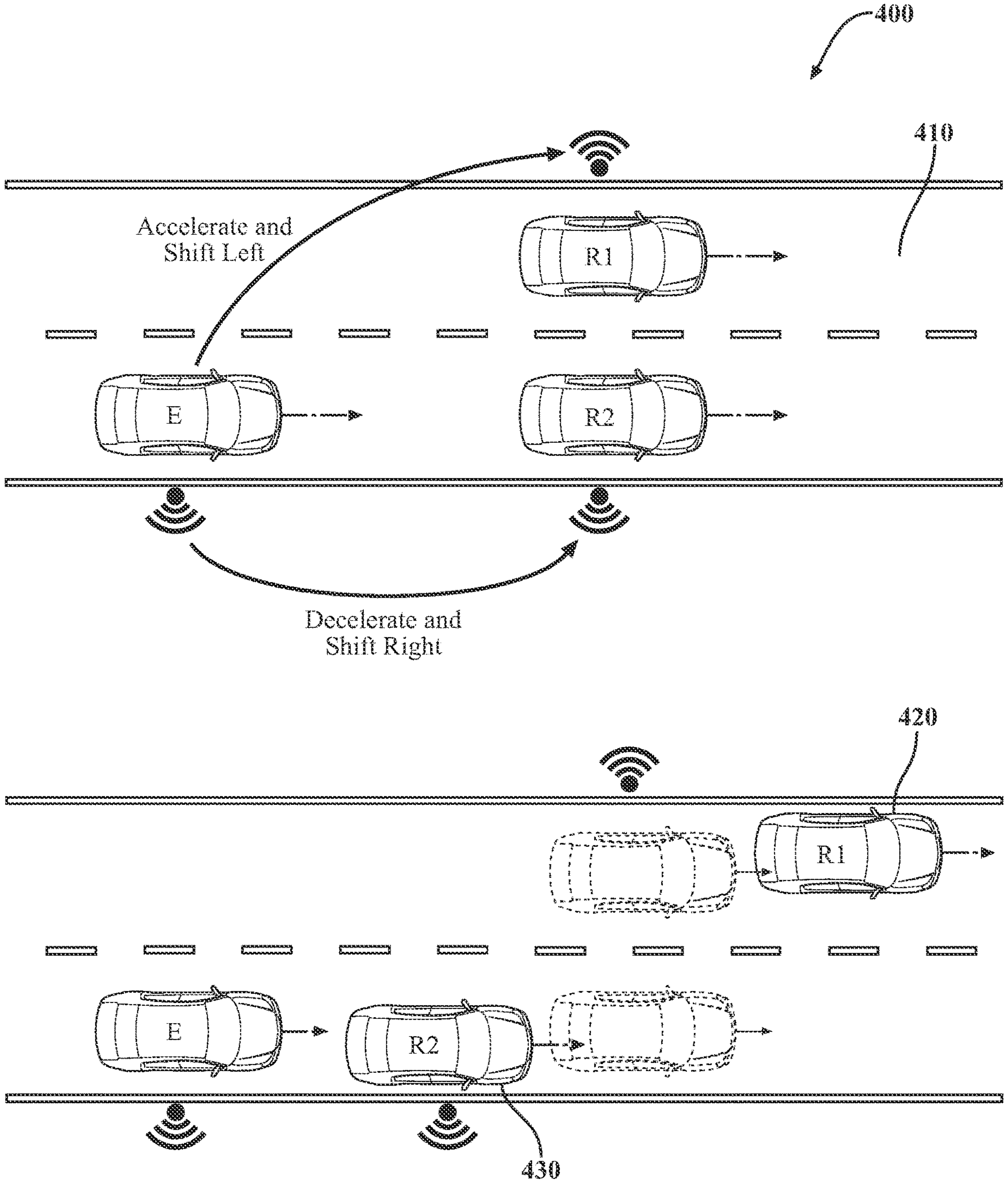
FIG. 4 illustrates an example of a subject vehicle observing maneuvers to distinguish safety messages from indeterminate vehicles.
Figure 5:
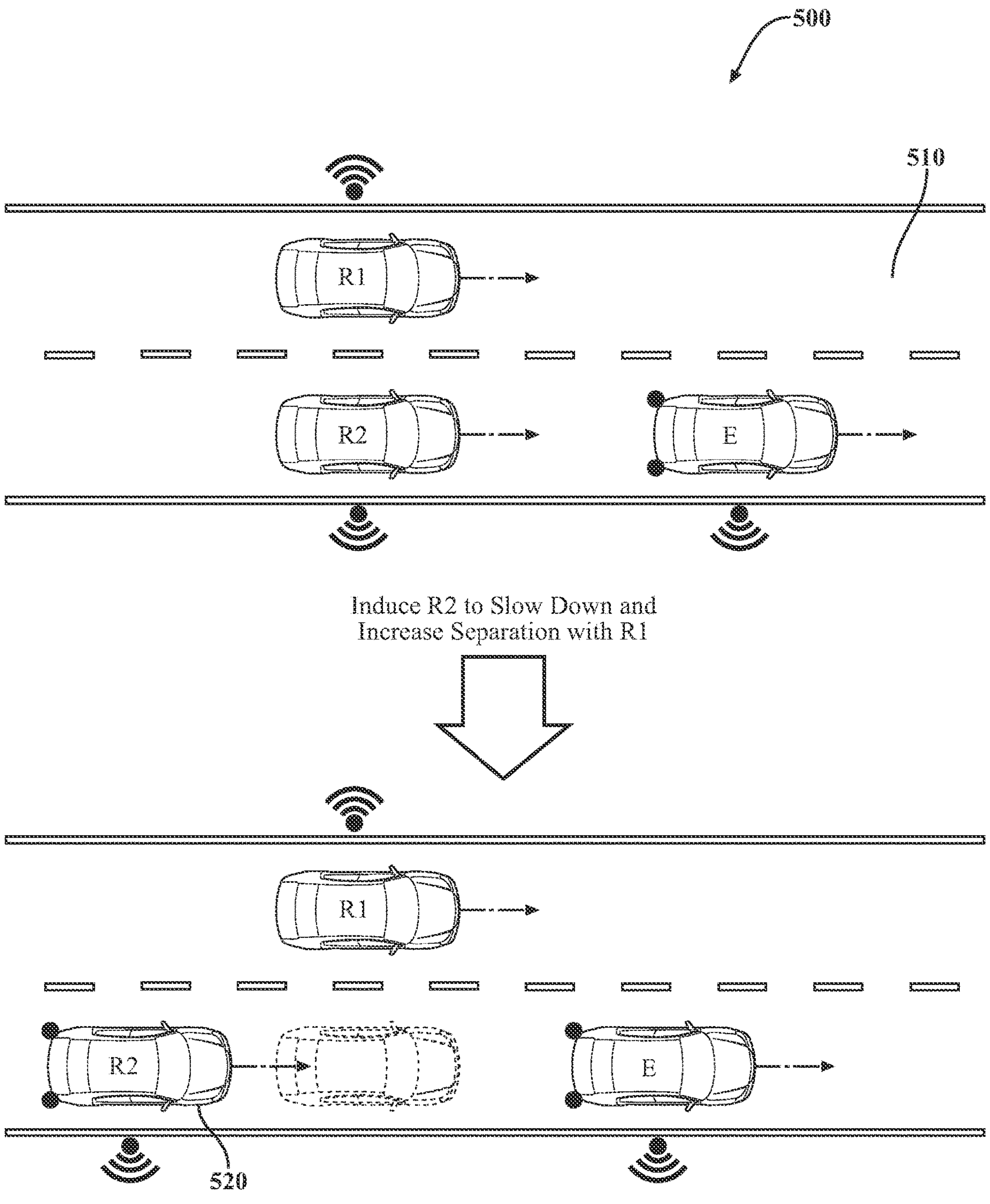
FIG. 5 illustrates an example of a subject vehicle inducing motion by indeterminate vehicles.
Figure 6:
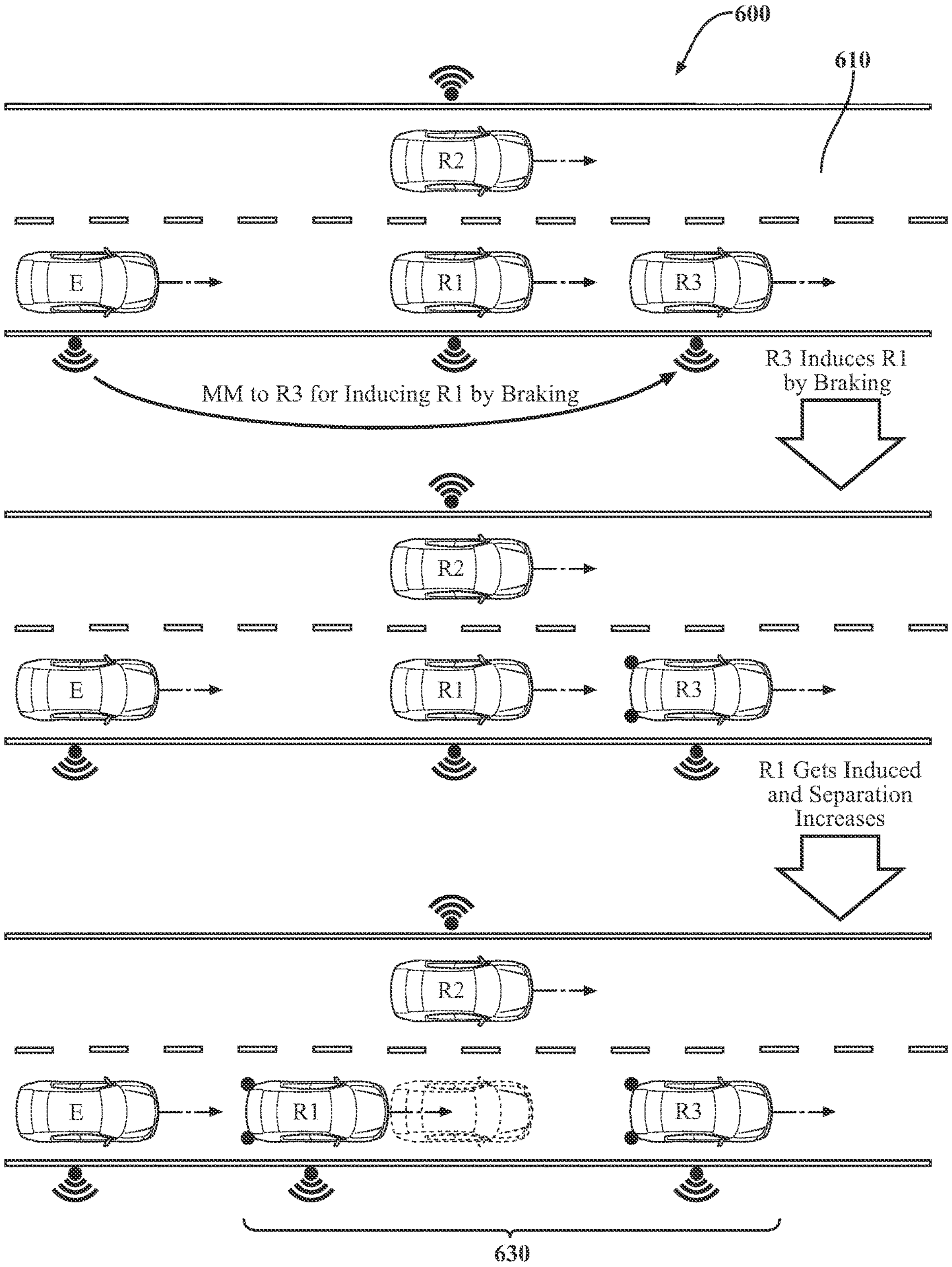
FIG. 6 illustrates an example of a subject vehicle observing maneuvers that help distinguish safety messages using a maneuver message and inducement.

Now turning to FIGS. 4-6, examples for observing trajectories invoked directly or induced that improves the communication of safety messages are illustrated. In FIG. 4, an example of the vehicle 100 (e.g., an ego vehicle E, a subject vehicle, etc.) observing trajectories that help distinguish safety messages from indeterminate vehicles 400 is illustrated. Regarding scenario 410, the vehicle 100 generates trajectories for the vehicles R1 and R2 (e.g., connected vehicles, level 3+ vehicles, etc.) that help distinguish safety messages. The scenario 410 can involve a set (e.g., 4) of determinate vehicles and a set of indeterminate vehicles (e.g., 2) communicating safety messages with the vehicle 100. Here, the vehicle 100 uses the sensor system 120 to detect that the vehicles R1 and R2 (e.g., a set) are traveling side-by-side. For example, the vehicle 100 perceives vehicles using data from the LIDAR sensors 124, GPS, the one or more cameras 126, and so on. However, the identification system 170 has difficulties distinguishing between the vehicles R1 and R2 and corresponding safety messages using unassociated or similar identifiers. As such, the vehicle 100 generates a MM for the vehicle(s) R1 and R2 suggesting the generated trajectories.

In various implementations, the signature trajectory generator 340 uses a cost function J to generate the trajectories:

$$J=(\|x_{R1}(t_f)-x_{R2}(t_f)\|)^2+K_1(\|v_{R1}(t_f)-v_{R2}(t_f)\|)^2+K_2\int_{t_0}^{t_f}(u_E(t))^2dt. \quad \text{Equation (1)}$$

Here, the first term represents the distance (e.g., along one dimension x) between the vehicles R1 and R2. The second term represents the velocity difference between the vehicles R1 and R2. The third term is a control input for an inducement (e.g., nudge). In particular, the variable x represents position, v represents velocity, t represents time. In one approach, the identification system 170 uses Equation 1 to optimize separation (e.g., maximum distance) and velocity between R1 and R2 while maintaining comfort and traffic safety. For example, a trajectory is safe following a set upper-bound for acceleration/jerk and a lower-bound for a time-to-collision as constraints in a driving scenario.

Furthermore, the identification system 170 adjusts multiplication constants $K_1$ and $K_2$ according to hardware and mechanical capabilities of vehicles in the driving scenario. For example, $u_E$ represents a control input that prevents sudden braking or maneuvers during an inducement (e.g., nudge). As such, the identification system 170 can adjust $K_2$ to penalize sudden braking using varying degrees, thereby managing traffic safety.

In one approach, the identification system 170 or maneuver module 220 determines position and velocity changes for the vehicles R1 and R2. For example, the vehicle 100 transmits a MM for the vehicle R1 to accelerate and shift left 420 associated with a cost function. The vehicle R2 receives a message to decelerate and shift right 430. Here, a cost function J can safely increase the distance and the velocity differences between the vehicles R1 and R2. After the maneuvers, the vehicle 100 readily identifies safety messages from the vehicles R1 and R2 by observing the trajectories or factoring the new attributes. In one approach, the identification system 170 forms an association between the vehicles R1 and R2 that improves vehicle and safety message identifications.

Turning now to FIG. 5, an example of a subject vehicle inducing motion by indeterminate vehicles 500 is illustrated. Here, the vehicle 100 (e.g., an ego vehicle E, a subject vehicle, etc.) receives safety messages (e.g., BSMs) from the vehicles R1 and R2 (e.g., level 0-2 vehicles) having unassociated or similar identifiers. Vehicles traveling on the road 510 may communicate through vehicle-to-vehicle (V2V) protocols, an ad-hoc protocol, and so on. The vehicle 100 detects that the vehicles R1 and R2 are trailing using the sensor system 120. For example, the vehicle 100 perceives vehicles using data from the LIDAR sensors 124, GPS, the one or more cameras 126, and so on. Like the scenario 410, the vehicles R1 and R2 are traveling side-by-side, thereby making the identification of communications difficult.

Moreover, the identification system 170 determines that an inducement will help differentiate safety messages between the vehicles R1 and R2. Here, the identification system 170 utilizes inducement since the vehicles R1 and R2 are minimally automated and incapable of processing MMs. As such, the vehicle 100 braking implicitly forces the vehicle R2 to execute a distinguishable trajectory 520. In particular, the braking causes the vehicle R2 to decrease velocity, which indirectly distinguishes communications from the vehicle R1.

In one approach, the identification system 170 uses a vehicle-following model that estimates motion behavior and reactions for the vehicles R1 and R2 within a traffic flow. For example, the vehicle 100 predicts through the vehicle-following model (e.g., a simulation of urban mobility (SUMO) model) that certain braking influences the real-time position and velocity of the vehicle R2. For instance, the vehicle-following model predicts reactions by trailing vehicles when the vehicle 100 brakes by 2 $m/s^2$ over 1 second. The influence is adjusted so that the vehicle R2 follows a trajectory generated by the signature trajectory generator 340.

In FIG. 5, the vehicle 100 may brake to maximize separation between the vehicles R1 and R2 while mitigating traffic disturbances. Here, a suggested trajectory may be a function of cost J:

$$J=(\|x_{R1}(t_f)-x_{R2}(t_f)\|)^2+K_1(\|v_{R1}(t_f)-v_{R2}(t_f)\|)^2+K_2T(x,v). \quad \text{Equation (2)}$$

Equation (2) references variables similar to Equation (1). As previously explained, a trajectory can be safe when following a set upper-bound for acceleration/jerk and a lower-bound for a time-to-collision T(x,v) as constraints. Unlike Equation (1), the identification system 170 adjusts the constant $K_2$ according to traffic disturbances (e.g., traffic jams) from position and velocity changes.

After the maneuvers, the vehicle 100 readily identifies safety messages from the vehicles R1 and R2 by observing the slowdown. In one approach, the identification system 170 forms an association between the vehicles R1 and R2.

The association improves vehicle and safety message identifications because the vehicle 100 observed motion and position changes that are verifiable by comparing a history of BSMs.

Now turning to FIG. 6, an example of a subject vehicle observing maneuvers that help distinguish safety messages using a MM and inducement 600 is illustrated. Here, the vehicle 100 (e.g., an ego vehicle E, a subject vehicle, etc.) is traveling on the right lane behind one or more connected vehicles (e.g., three). As in other examples, the vehicles R1 and R2 (e.g., level 0-2 vehicles) are traveling side-by-side in the right and left lanes, respectively. The vehicle R3 is a level 3+ connected and automated vehicle traveling in the right lane. For this example, vehicles traveling on the road 610 may communicate through V2V protocols, an ad-hoc protocol, and so on.

During travel, the vehicle 100 receives a safety message (e.g., BSM) from the vehicle R3. The identification system 170 determines that R3 braking would help distinguish safety message communications between the vehicles R1 and R2 through traffic change 630. Here, the vehicle R3 induces braking by the vehicle R1, such as according to a cost function. In one approach, the identification system 170 uses the vehicle R3 since other vehicles are minimally automated and thereby unable to process MMs. As such, the vehicle R3 executes subtle braking specified by a MM received from the vehicle 100 while maintaining traffic safety. The subtle braking forces the vehicle R1 to slow down and separate from the vehicle R2. The motion by the vehicle R1 represents a trajectory observed by the vehicle 100 that is identifiable from the vehicle R2. After separation, the vehicle 100 can identify or distinguish between the vehicles R1 and R2.

Figure 7:
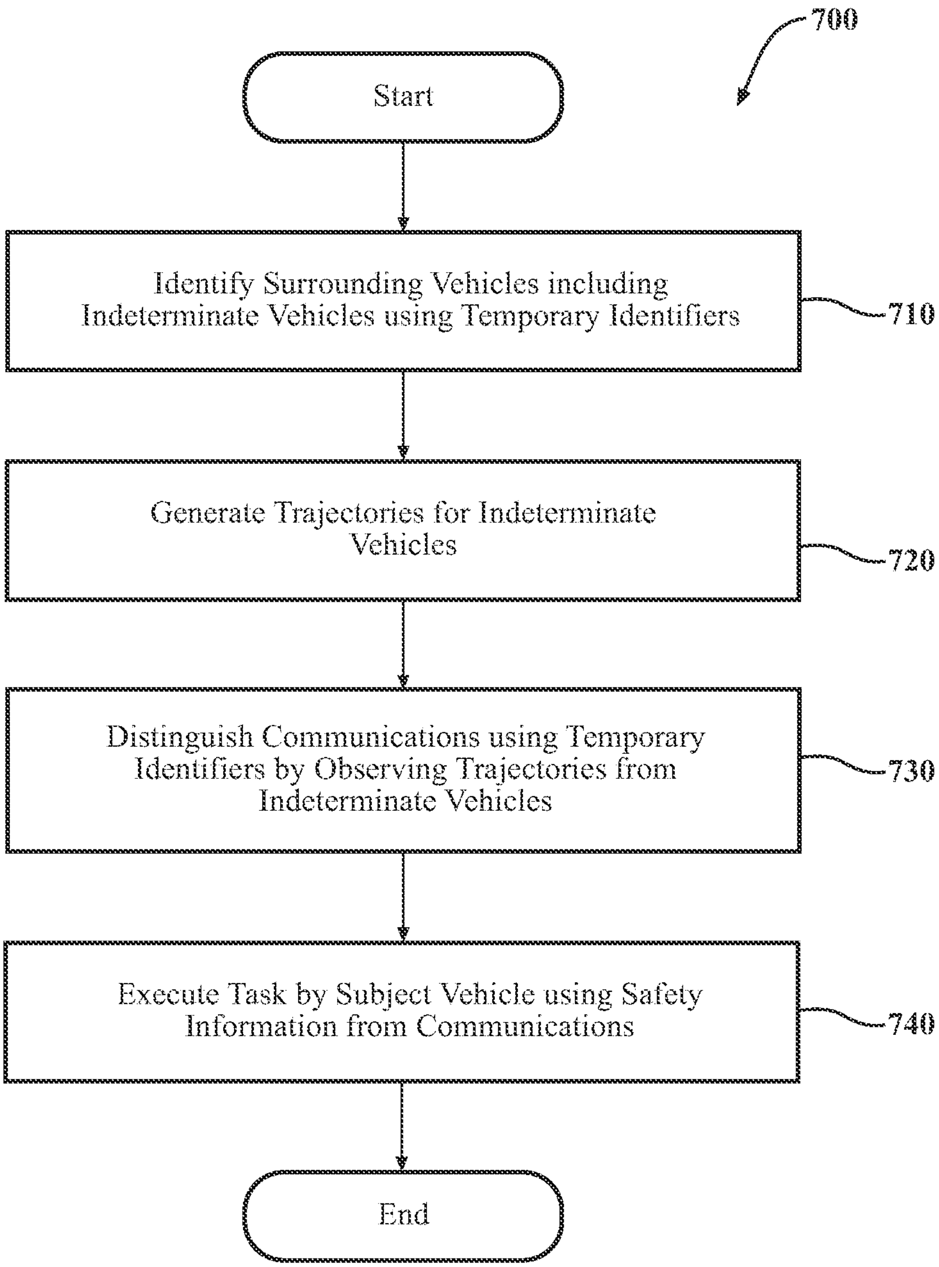
FIG. 7 illustrates one embodiment of a method that is associated with identifying connected vehicles by invoking maneuvers that help distinguish between safety messages.

Regarding FIG. 7, a flowchart of a method 700 that is associated with improving vehicle communications by invoking maneuvers that help distinguish between safety messages is illustrated. Method 700 will be discussed from the perspective of the identification system 170 of FIGS. 1 and 2. While method 700 is discussed in combination with the identification system 170, it should be appreciated that the method 700 is not limited to being implemented within the identification system 170 but is instead one example of a system that may implement the method 700.

At 710, the identification system 170 identifies surrounding vehicles including indeterminate vehicles using temporary identifiers. Here, the identification system 170 can determine a local representation that estimates attributes (e.g., position, velocity, etc.) of road users. For example, a local representation function processes sensor data, communicated data from the road users, and GPS data. The data is utilized to associate and distinguish safety messages from determinate and indeterminate vehicles.

Moreover, the local representation function receives relations between surrounding vehicles from an association function. Two or more vehicles may be associated if they are determinate, indeterminate, or both when communicating safety messages with unassociated or similar identifiers. For example, the association function associates determinable vehicles using received identifiers, local perception, and remote perception. Here, the safety message can be a BSM that includes position, velocity, or static/dynamic information of surrounding vehicles. As previously explained, the identification system 170 can invoke trajectories by transmitting a MM to the surrounding vehicles. The MM may be a wireless message exchanged between road users and infrastructure that suggests a future trajectory(s) for a road user.

At 720, the maneuver module 220 generates trajectories for the indeterminate vehicles. Here, the trajectories and position changes associated with safety messages assist in identifying safety messages from indeterminate vehicles. In various implementations, the identification system 170 generates a signature trajectory using the local representation function that estimates the attributes (e.g., position, velocity, color, etc.) of the road users. The local representation function may be a computation model that performs coordinate transformations from the vehicle 100 to other vehicles using acquired data. At times, the local representation function can misidentify vehicles from errors in sensor and GPS data, especially during complex driving scenarios. As such, the identification system 170 estimates trajectories for the subject or indeterminate vehicles that help distinguish between safety message communications.

As previously explained, the vehicle 100 can communicate a MM when safety message communications are distinguishable by observing other vehicles execute certain trajectories. In one approach, the vehicle 100 executes the trajectory to induce motion by indeterminate vehicles. For example, an indeterminate vehicle has minimal automated capabilities to process and execute the trajectory specified by a MM. In this way, the identification system 170 avoids communicating a MM and induces motion by the indeterminate vehicle, thereby helping safety message identification.

At 730, the identification system 170 distinguishes communications using temporary identifiers by observing trajectories from indeterminate vehicles. As previously explained, the identification system 170 distinguishes communications to identify between indeterminate vehicles. Here, the identification system 170 observes the trajectory from the MM executed by an indeterminate vehicle to distinguish safety messages. For example, the MM suggests that a first indeterminate vehicle accelerates and shifts left using a cost function. Criteria for the cost function can be to minimize traffic disturbances. The MM also suggests that a second indeterminate vehicle decelerates and shifts right. In this way, the identification system 170 can identify safety messages from the two vehicles through improved spacing, positioning, and trajectory observations.

As previously explained, the vehicle 100 can also induce motion for distinguishing safety messages from indeterminate vehicles traveling near determinable vehicles. As such, the vehicle 100 brakes to force distinguishable trajectories by the indeterminable vehicles. For example, the braking causes an indeterminable vehicle to decrease velocity that indirectly distinguishes communications from another indeterminable vehicle. Accordingly, improved spacing, positioning, and motion observed for connected vehicles assist the vehicle 100 with distinguishing between safety messages having unassociated or similar identifiers.

In various implementations, the identification system 170 uses inducement and communicates a MM for improving communications of safety messages. For example, the vehicle 100 receives a safety message (e.g., BSM) from a connected vehicle. The identification system 170 determines that the connected vehicle braking would help distinguish safety message communications between two indeterminate vehicles. The identification system 170 plans to utilize the connected vehicle since the indeterminate vehicles are minimally automated and thereby unable to process a MM. Here, the connected vehicle induces braking by an indeterminate vehicle. As such, the connected vehicle executes subtle braking specified by the MM. The subtle braking forces one or more indeterminate vehicles to slow down and increase separation. The motion by an indeterminate vehicle represents a trajectory observed by the vehicle 100. The motion also facilitates identification from other vehicles through distinguishable positioning and spacing.

At 740, the vehicle 100 executes a task using safety information from communications. For example, a safety message (e.g., BSM) from a recently distinguished vehicle indicates a position change. The vehicle 100 changes lanes or accelerates if the position change is within a safety threshold. In another example, a connected vehicle relays a safety message from a recently distinguished vehicle. The safety message indicates that the connected vehicle will reduce velocity since the recently distinguished vehicle is turning. As such, the vehicle 100 reduces speed to avoid a collision and improve traffic safety. Accordingly, the identification system 170 invokes trajectories so that safety messages from surrounding vehicles having unassociated or similar identifiers are distinguishable through observation, thereby improving safety and connectivity.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the identification system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110, the identification system 170, and/or the automated driving module(s) 160 may control some or all of the vehicle systems 140 and, thus, may be partially or fully autonomous as defined by the society of automotive engineers (SAE) levels 0 to 5.

The processor(s) 110, the identification system 170, and/or the automated driving module(s) 160 can be operatively connected to communicate with the various vehicle systems 140 and/or individual components thereof. For example, returning to FIG. 1, the processor(s) 110, the identification system 170, and/or the automated driving module(s) 160 can be in communication to send and/or receive information from the various vehicle systems 140 to control the movement of the vehicle 100. The processor(s) 110, the identification system 170, and/or the automated driving module(s) 160 may control some or all of the vehicle systems 140.

The processor(s) 110, the identification system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the identification system 170, and/or the automated driving module(s) 160 can control the direction and/or speed of the vehicle 100. The processor(s) 110, the identification system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the identification system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An identification system comprising:

a processor; and a memory storing instructions that, when executed by the processor, cause the processor to:

identify surrounding vehicles including indeterminate vehicles from a driving environment using temporary identifiers received from the surrounding vehicles;

generate trajectories for the indeterminate vehicles;

distinguish the indeterminate vehicles from communications using the temporary identifiers by observing execution of the trajectories by the indeterminate vehicles, and a subject vehicle changes motion that induces the trajectories for one of the indeterminate vehicles unable to process a maneuver message (MM) and the subject vehicle directly invokes the trajectories by transmitting the MM to the surrounding vehicles; and execute a planning task by the subject vehicle using safety information from the communications.

2. The identification system of claim 1 further including instructions to:

command one of the surrounding vehicles to execute one of the trajectories automatically without an operator according to the MM, and the one of the surrounding vehicles has a society of automotive engineers (SAE) automation level above three;

wherein the subject vehicle concurrently induces the trajectories and the subject vehicle directly invokes the trajectories;

wherein the one of the indeterminate vehicles has a SAE automation level between zero and two; and wherein the MM has coordinate and velocity changes that define the trajectories.

3. The identification system of claim 1 further including instructions to adapt motion by the subject vehicle using a vehicle-following model and the trajectories to induce implementation of the trajectories by the indeterminate vehicles, wherein the vehicle-following model predicts reactions by the indeterminate vehicles to traffic maneuvers using a cost function.

4. The identification system of claim 1 further including instructions to:

communicate the MM with motion instructions using the trajectories to at least one of the surrounding vehicles; and adapt motion by the at least one of the surrounding vehicles using a vehicle-following model to induce the execution by the indeterminate vehicles, wherein the vehicle-following model predicts reactions by the indeterminate vehicles to traffic maneuvers using a cost function.

5. The identification system of claim 1, wherein the instructions to identify the surrounding vehicles further include instructions to compare perception computations by the subject vehicle to remote perceptions received from the surrounding vehicles.

6. The identification system of claim 1, wherein:

a cost function maximizes velocity differences between the indeterminate vehicles, and a subset of the indeterminate vehicles has a society of automotive engineers (SAE) automation level above three and communication connections that are active with the subject vehicle.

7. The identification system of claim 1, wherein the temporary identifiers are shared by at least two of the indeterminate vehicles within basic safety messages (BSM) and the BSMs include position and velocity information for the at least two of the indeterminate vehicles.

8. The identification system of claim 1 wherein the instructions to distinguish the indeterminate vehicles further include instructions to adapt separation between the indeterminate vehicles through the trajectories.

9. The identification system of claim 1 further including instructions to:

generate the trajectories using a cost function, the trajectories are signature trajectories that differentiate at least two indeterminate vehicles and an identifiable vehicle of the surrounding vehicles with motion patterns that are unique; and wherein the cost function includes a control input inducing the trajectories, an upper-bound parameter for jerk, a lower-bound for a time-to-collision among the indeterminate vehicles, and a sudden-braking parameter.

10. A non-transitory computer-readable medium comprising:

instructions that when executed by a processor cause the processor to:

identify surrounding vehicles including indeterminate vehicles from a driving environment using temporary identifiers received from the surrounding vehicles;

generate trajectories for the indeterminate vehicles;

distinguish the indeterminate vehicles from communications using the temporary identifiers by observing execution of the trajectories by the indeterminate vehicles, and a subject vehicle changes motion that induces the trajectories for one of the indeterminate vehicles unable to process a maneuver message (MM) and the subject vehicle directly invokes the trajectories by transmitting the MM to the surrounding vehicles; and execute a planning task by the subject vehicle using safety information from the communications.

11. The non-transitory computer-readable medium of claim 10, further including instructions to adapt motion by the subject vehicle using a vehicle-following model and the trajectories to induce implementation of the trajectories by the indeterminate vehicles, wherein the vehicle-following model predicts reactions by the indeterminate vehicles to traffic maneuvers using a cost function.

12. A method comprising:

identifying surrounding vehicles including indeterminate vehicles from a driving environment using temporary identifiers received from the surrounding vehicles;

generating trajectories for the indeterminate vehicles;

distinguishing the indeterminate vehicles from communications using the temporary identifiers by observing execution of the trajectories by the indeterminate vehicles, and a subject vehicle changing motion that induces the trajectories for one of the indeterminate vehicles unable to process a maneuver message (MM) and the subject vehicle directly invoking the trajectories by transmitting the MM to the surrounding vehicles; and executing a planning task by the subject vehicle using safety information from the communications.

13. The method of claim 12 further comprising:

commanding one of the surrounding vehicles to execute one of the trajectories automatically without an operator according to the MM, and the one of the surrounding vehicles has a society of automotive engineers (SAE) automation level above three;

wherein the subject vehicle concurrently induces the trajectories and the subject vehicle directly invokes the trajectories;

wherein the one of the indeterminate vehicles has a SAE automation level between zero and two; and wherein the MM has coordinate and velocity changes that define the trajectories.

14. The method of claim 12 further comprising adapting motion by the subject vehicle using a vehicle-following model and the trajectories to induce implementation of the trajectories by the indeterminate vehicles, wherein the vehicle-following model predicts reactions by the indeterminate vehicles to traffic maneuvers using a cost function.

15. The method of claim 12 further comprising:

communicating the MM with motion instructions using the trajectories to at least one of the surrounding vehicles; and adapting motion by the at least one of the surrounding vehicles using a vehicle-following model to induce the execution by the indeterminate vehicles, wherein the vehicle-following model predicts reactions by the indeterminate vehicles to traffic maneuvers using a cost function.

16. The method of claim 12, wherein identifying the surrounding vehicles further includes comparing perception computations by the subject vehicle to remote perceptions received from the surrounding vehicles.

17. The method of claim 12, wherein:

a cost function maximizes velocity differences between the indeterminate vehicles, and a subset of the indeterminate vehicles has a society of automotive engineers (SAE) automation level above three and communication connections that are active with the subject vehicle.

18. The method of claim 12, wherein the temporary identifiers are shared by at least two of the indeterminate vehicles within basic safety messages (BSM) and the BSMs include position and velocity information for the at least two of the indeterminate vehicles.

19. The method of claim 12 wherein distinguishing the indeterminate vehicles further includes adapting separation between the indeterminate vehicles through the trajectories.

20. The method of claim 12 further comprising:

generating the trajectories using a cost function, the trajectories are signature trajectories that differentiate at least two indeterminate vehicles and an identifiable vehicle of the surrounding vehicles with motion patterns that are unique; and wherein the cost function includes a control input inducing the trajectories, an upper-bound parameter for jerk, a lower-bound for a time-to-collision among the indeterminate vehicles, and a sudden-braking parameter.

* * * * *